G. F. BECKWITH.
MOTOR DRIVEN HOOF TRIMMER.
APPLICATION FILED JUNE 18, 1914.
1,126,945.
Patented Feb. 2, 1915.
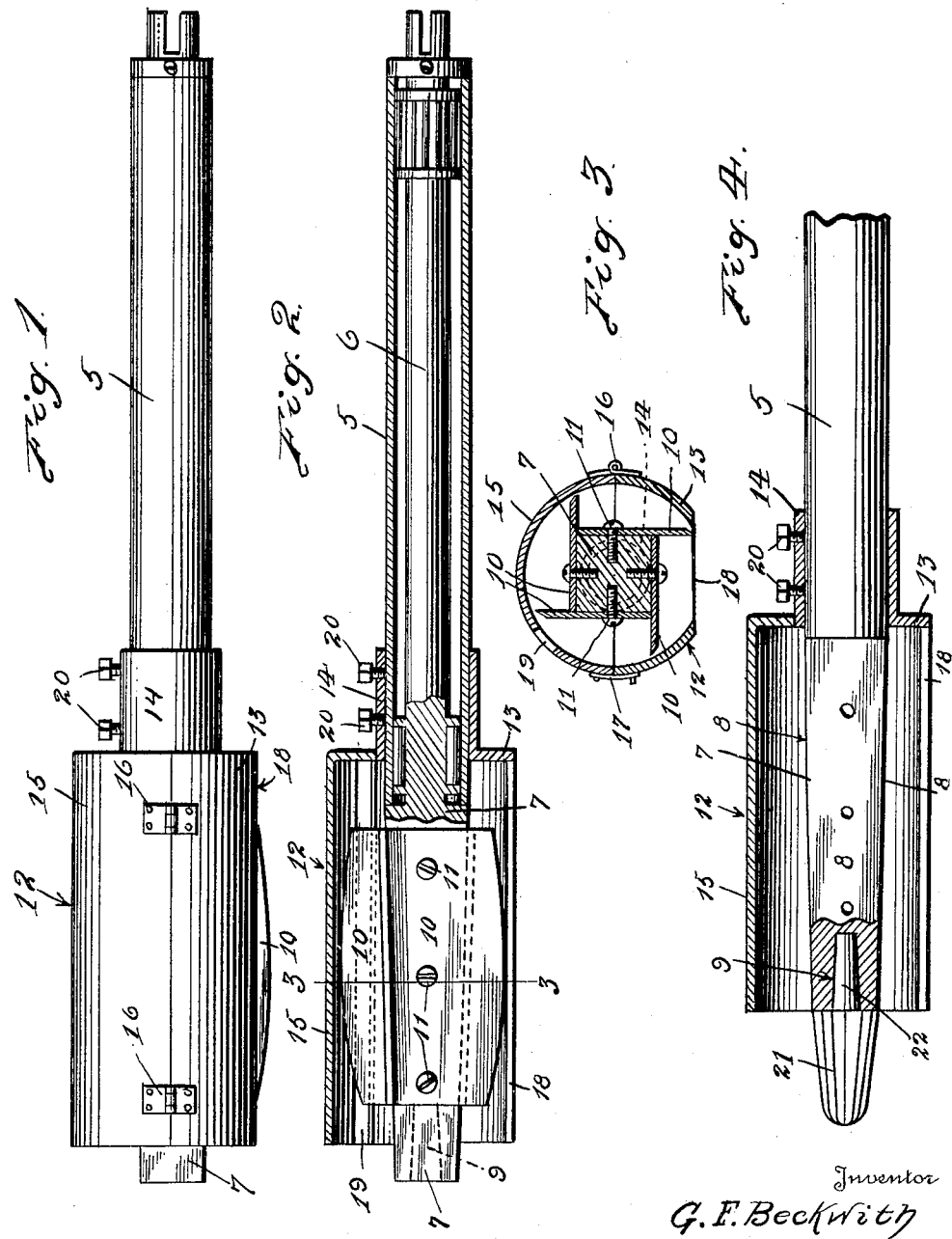

UNITED STATES PATENT OFFICE.

GEORGE F. BECKWITH, OF ELLIOTT, IOWA.

MOTOR-DRIVEN HOOF-TRIMMER.

1,126,945.  Specification of Letters Patent.  Patented Feb. 2, 1915.

Application filed June 18, 1914. Serial No. 845,987.

*To all whom it may concern:*

Be it known that I, GEORGE F. BECKWITH, a citizen of the United States, residing at Elliott, in the county of Montgomery, State of Iowa, have invented certain new and useful Improvements in Motor-Driven Hoof-Trimmers; and I do hereby declare the following to be a full, clear, and exact description of the invention, such as will enable others skilled in the art to which it appertains to make and use the same.

This invention relates to farriers' tools, particularly to devices for trimming horses' hoofs, and has for its object the provision of a novel motor driven tool whereby horses' hoofs may be expeditiously and properly trimmed, thus saving the time involved in changing from one tool to another as is the common practice, and obviating the necessity of the farrier straddling the horse's leg.

A further object is the provision of a device of this character which may be easily operated without danger to the horse or to the operator.

An additional object is the provision of a device of this character employing a plurality of cutting blades, the degree of protrusion of which is regulable by the operator.

Still another object is the provision of a device of this character which will be simple and inexpensive in construction, efficient and durable in use and a general improvement of the art.

Other objects and advantages will be made apparent during the course of the following description accompanied by the illustrative drawing, in which, Figure 1 is a side elevation of the device, Fig. 2 is a vertical sectional view therethrough, Fig. 3 is a cross sectional view, and Fig. 4 is a view of the device adapted to serve as a corn cutter.

Referring more particularly to the drawing, the numeral 5 designates the handle of my device which is tubular in shape and formed preferably of some such material as wood or fiber. Disposed within the handle 5 is a shaft 6 which is journaled through and spaced from the handle by suitable roller bearings. The shaft 6 is driven from an electric motor by any suitable means, such as by keying or by employing a flexible connection (not shown). At its forward end the shaft 6 is provided with an enlarged head 7 formed preferably square in cross section to form a plurality of flat faces 8. The head is frusto-pyramidal in shape and is provided upon its front end with a conical recess 9 for a purpose to be described.

Cutting blades 10 are adapted to be secured upon the faces 8 by means of screws 11 passing through the blades and into the head. As the shaft 6 is rotated within the handle 5, the head 7 will of course be rotated also carrying with it the blades 10.

In order that the horse and operator may not be injured by the rotating knives I provide a casing 12, cylindrical in shape and disposed about the head and blades. The casing 12 comprises a main portion 13 having a sleeve 14 formed thereon and surrounding the handle 5 adjacent the head 7. A removable portion 15 is hinged upon one edge of the main portion 13 as shown at 16 and has its other edge secured by suitable catches 17.

In order that the knives 10 may protrude from the side of the casing 12 to perform their cutting function, I provide the slot 18 of sufficient width that the edges of the blades will extend beyond the plane of the edges of the slot during their rotation. A second slot 19 is provided to permit of the discharge of the parings.

In order that the blades may be protruded to a greater or less degree through the slots 18, I provide the sleeve 14 with set screws 20 engaging the handle 5. When the set screws 20 are loosened and the casing 12 moved rearwardly of the device, the blades 10 will extend farther through the slot 18, thereby producing a thicker paring. When a thinner paring is desired it is merely necessary to move the casing 12 forwardly, whereupon the blades will not extend so far through the slot.

From the foregoing description and a study of the drawings it will be apparent that when the shaft is rotated by a motor, the blades 10 will be rapidly rotated and will have a planing effect upon the desired portion of a horse's hoof, thereby enabling the horse's hoof to be leveled and trimmed.

When it is desired to use the device for paring or gouging corns, the casing 12 is moved forwardly so that the blades will not protrude therefrom. A suitable bur 21 may be attached to the end of the head 7 by forcing its tapered shank 22 into the recess 9.

From the foregoing it will be apparent that I have thus provided a simple and efficient device whereby horses' hoofs may be properly leveled, trimmed and relieved from corns. The provision of this device obviates the necessity for changing from one tool to another as is now necessary and relieves the farrier from the dangerous practice of getting astride the horses' legs.

It will be readily understood that I reserve the right to make various changes in the form, construction and arrangement of parts as will not depart from the spirit of the invention or limit the scope of the subjoined claims.

The slot 19 in the hinged cover is designed to permit the parings to escape from the casing while the hinged cover is designed to permit of ready access to the interior of the casing.

Having thus described my invention, I claim:

1. A device of the character described comprising a handle, a shaft journaled therethrough, a head formed on said shaft, a plurality of blades secured upon said head and a casing adjustable longitudinally upon said handle and provided with a slot for the exposure of said blades during their rotation.

2. A device of the character described comprising a tubular handle, a shaft journaled therethrough, a head on said shaft, a plurality of blades secured upon said head and a shell surrounding said head and said blades, said shell being provided with a slot for the exposure of said blades during their rotation, said shell being movable upon said handle whereby said blades may be exposed to a greater or less degree.

3. A device of the character described comprising a tubular handle, a shaft journaled therein, a head formed on said shaft and provided with a plurality of flat faces, blades secured upon said flat faces, a casing disposed around said head and blades and provided with a slot whereby said blades may protrude during their rotation, said casing being provided with a hinged portion in its periphery, a sleeve formed on said casing and extending around said handle, and means for holding said sleeve in longitudinally adjusted positions upon said handle.

In testimony whereof I affix my signature, in the presence of two witnesses.

GEORGE F. BECKWITH.

Witnesses:
  JOHN SMITH,
  A. LEONARD.